Aug. 10, 1954     H. B. FECHTER     2,685,927
FLANGE AND/OR HOLE CUTTING MACHINE FOR SHEET MATERIAL
Filed Jan. 11, 1951     3 Sheets-Sheet 1
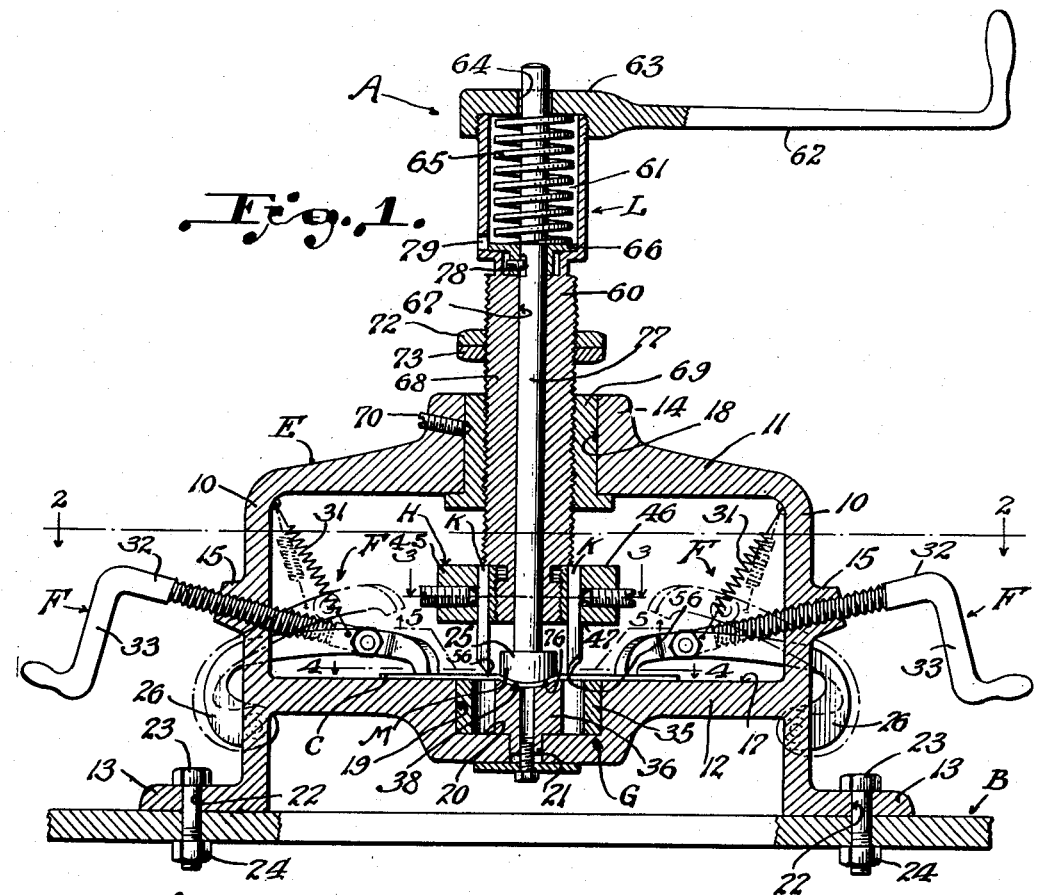
Inventor
Harry B. Fechter
By
Lancaster, Allwine & Rommel
Attorneys

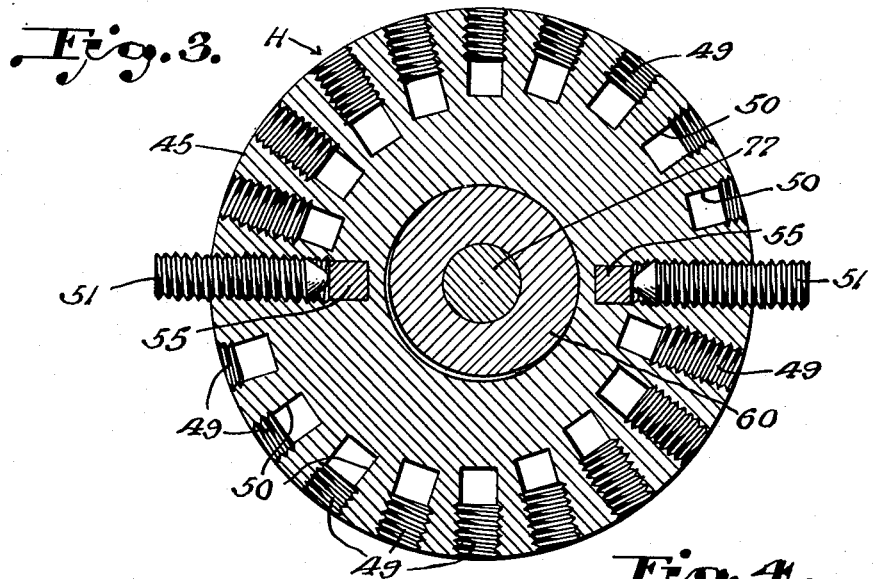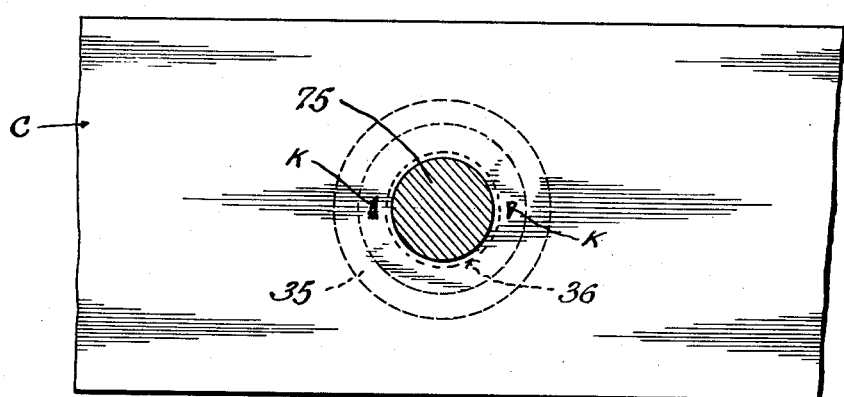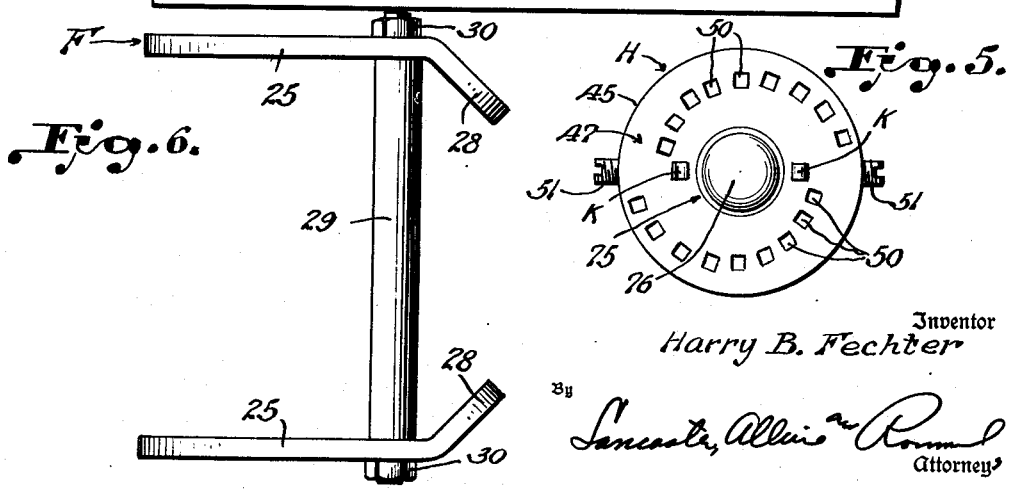

Aug. 10, 1954  H. B. FECHTER  2,685,927
FLANGE AND/OR HOLE CUTTING MACHINE FOR SHEET MATERIAL
Filed Jan. 11, 1951  3 Sheets-Sheet 3
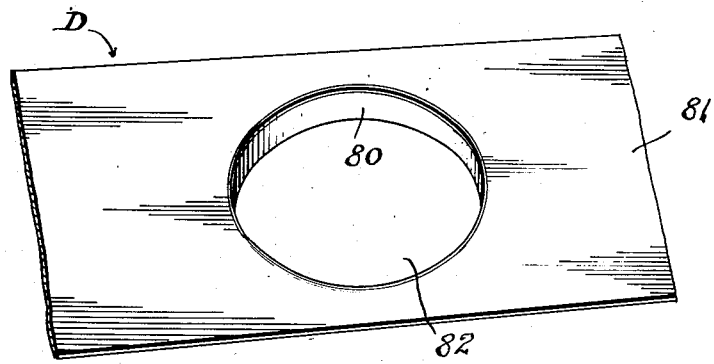
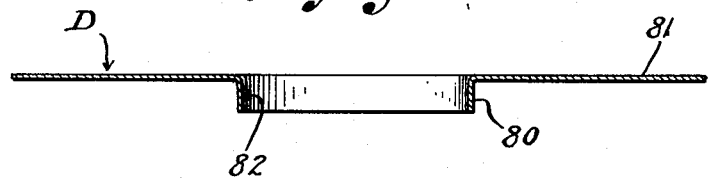
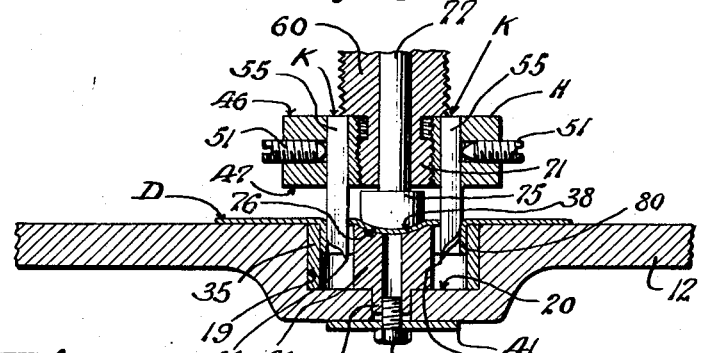
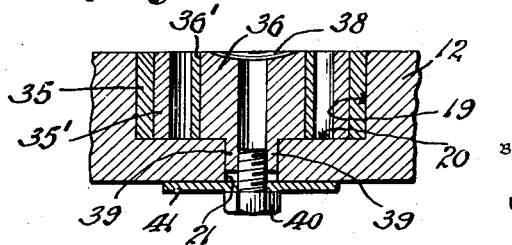
Inventor
Harry B. Fechter
Attorneys.

Patented Aug. 10, 1954

2,685,927

UNITED STATES PATENT OFFICE 2,685,927

FLANGE AND/OR HOLE CUTTING MACHINE FOR SHEET MATERIAL

Harry B. Fechter, Minneapolis, Minn.

Application January 11, 1951, Serial No. 205,504

4 Claims. (Cl. 164—79)

This invention relates to sheet material working machines and more specifically to a machine for cutting a hole in sheet material and, if desired, providing a flange surrounding the hole. The sheet material may be sheet metal stock and the flanged articles of manufacture produced by the machine may be employed with the flanges fitting into the ends of tubes adapted to be connected with a tank or reservoir and all the parts secured together as by soldering.

An important object of the invention is to provide a machine for the purpose described whereby the flange is formed as a mere continuation of the hole-cutting operation.

Another important object is to provide a machine in which the stock is firmly and securely held in place during operations thereon.

A further important object is to enable stock to be operated upon which stock may not be wholly smooth-surfaced.

Furthermore, an important object is to provide a machine as described which may be readily adapted for cutting holes of selected diameters and providing flanges of various depths.

Another important object is to provide means for retaining the stock in an immovable position during operations thereon but this means is such that the discs removed in the cutting operations are not damaged and may be used for patches and the like in other operations not identified with the cutting and flanging operations.

Other objects and advantages of the invention will be apparent during the course of the following detailed description of the invention, taken in connection with the accompanying drawings, forming parts of this specification, and in which drawings:

Fig. 1 is a vertical section of the new machine, secured to a support and with stock held down in position for operation thereon by formers and/or cutters.

Fig. 2 is a horizontal section substantially on the line 2—2 of Fig. 1.

Fig. 3 is an enlarged horizontal section of a formers and/or cutters holder, substantially on the line 3—3 of Fig. 1.

Fig. 4 is a horizontal section, also on an enlarged scale, looking down upon the stock, substantially on the line 4—4 of Fig. 1.

Fig. 5 is a view substantially on the line 5—5 of Fig. 1 looking upwardly upon the holder of Fig. 3.

Fig. 6 is an enlarged fragmentary top plan of a portion of a hold-down means for the stock.

Fig. 7 is a perspective view of a flanged article of manufacture which may be produced by the new machine.

Fig. 8 is a vertical section of the article of Fig. 7.

Fig. 9 illustrates, in fragmentary vertical section, the article of Figs. 7 and 8 being formed by the die of the new machine.

Fig. 10 shows, in enlarged vertical section, a change in the die so that the machine will form a flanged article having a narrower flange.

In the drawings wherein for the purpose of illustration is shown a preferred embodiment of the invention and wherein similar reference characters designate corresponding parts throughout the several views, the letter A designates the new machine; B, a support therefor; C, a strip of material or stock; and D an article produced from the strip C by the machine A.

The new machine A comprises a frame E; movable hold-down means F; die assembly G; formers and/or cutters holder H; formers and/or cutters K; means L to rotate and reciprocate the formers and/or cutters K; stock-tensioning means M.

Referring mainly to Figs. 1 and 2, the frame E is shown to comprise a pair of spaced-apart, confronting and upwardly-extending walls 10, upper wall 11 joining the walls 10, horizontally-extending bed-plate 12 spaced below the wall 11 and joining the walls 10, an outwardly-extending foot portion 13 for each wall 10, and an annular collar 14 extending upwardly from the center of the wall 11.

Each of the walls 10 is preferably provided with an outwardly-extending bearing 15 each bearing disposed substantially a like distance above the bed-plate 12 with the bores of the bearings screw threaded, the axes of the bores inclined and extending toward the bed-plate and preferably disposed an equal distance from end edges or faces 16 of the walls 10. These bearings support part of the means F.

Preferably, the upper surface 17 of the bed-plate 12 is smooth and the axial center of the bed-plate (with its axes coincident with the axial center of the opening 18 of the collar 14) is surrounded by a circular recess 19 having a bottom 20 provided with an axially-disposed opening 21 which opens to the bottom face of the bed-plate.

The foot portions 13 may be provided with downwardly-extending, bolt shank-receiving openings 22 to receive the shanks of bolts 23 which shanks may extend into and through the support B, which may be a plate, with the heads of the bolts disposed upon the upper faces of the foot portions 13, and the nuts 24 tightened against the under face of the plate support B, this attaching means being described by way of an example.

Figures 1, 2 and 6 illustrate the movable hold-down means F which includes a suitable number (as four, disposed in two pairs, in the example shown) of elongated pivoted arms 25, somewhat J-shaped, with their curved portions 26 somewhat loosely pivoted to the walls 10 as by pivot means comprising screws 27 with their shanks extending through the portions 26 and 27 into suitable screw-threaded sockets extending inwardly from the end edges 16 of the walls 10, as just below the horizontal plane of the bed-plate 12. As may be seen in Figs. 2 and 6 the free end portions 28 of the arms 25 are inturned and have substantially flat bottom faces. Connecting each pair of arms 25 is an abutment and arms-connecting member, as a cross-member 29 having reduced, screw-threaded end portions and retained, as by means of nuts 30 screwed upon these free end portions when they are inserted into suitable openings in the free end portions 28. Thus it will be seen that the arms 25 may be swung into various positions such as the full lines and dot-and-dash lines positions of Fig. 1 and, although the arms 25 are thus pivoted to the outside of the frame E, the free inturned or offset end portions 28 are constructed and arranged to extend into the vertical plane of the bed-plate.

A retraction spiral spring 31, preferably for each arm 25, is secured at its lowermost end, to the arm near the juncture of the arm 25, and cross-member 29, and secured at its upper end is the frame E, as at the juncture of the walls 10 and 11. These springs 31 tend to raise the arms 25.

Means to adjustably hold the arm 25 into firm contact with a strip C disposed upon the bed-plate 12 for operations thereon, may comprise a rod 32 for each cross-member 29, with a part of the rod suitably screw-threaded to cooperate with the screw threads of the bearings 15. The outer end portion of the rod may form a crank 33 exteriorly of the frame E and the inner end portion 34 of the rod forms an end face for tight frictional engagement with the cross-member 29 when the arms 25 are lowermost, that is, in contact with a strip C. Rotation of the crank in one direction will tighten the contact and rotation in the other direction will move the rod away from the contact of the end portion 34 with the cross-member so that the latter will be released and the arms 25 will, accordingly, spring upwardly and the strip C will be released as is now apparent. Obviously, the operator may manually depress the arms 25 by pressing downwardly on the cross-member 29 with one hand and rotate the crank 33 until the inner end portion 34 contacts the cross-member.

It is preferred to provide the loose connection, and more specifically the single loose connection of rod 32 and cross-member 29, for each pair of arms 25 rather than a pair of linked connections, for example, since the construction disclosed allows for some unevenness of the surface of the stock C for the cross members may rock slightly to take care of such unevenness. However, the four-point connection disclosed, of the hold-down means F and stock C, is important and it is also important that, as may be seen in Fig. 2, the faces of the free end portions 28 of the arms contact the stock close to the sides of the bed-plate 12 and at rather widely spaced-apart locations.

The die assembly G preferably comprises two main portions 35 and 36. The outer portion 35 preferably comprises a ring for seating in the recess 19 with its outer face in contact with the side wall of the recess and its bottom resting upon the bottom wall 20. An outer ring portion 35 with one thickness of wall is shown, by way of illustration in Figs. 1 and 9 but the outer ring portion 35 may be doubled, as in Fig. 10 by the supplementary outer ring portion 35' and, even the inner ring portion 36, doubled as by the supplementary inner ring portion 36' which latter is, however, only a ring. However, the exterior circumference of the portion 35 of any such portion is always the same. The interior periphery or face 37 of the portion constitutes a flange-forming surface in the example shown in Fig. 1. The inner ring portion 36 has a preferably shallow, concave upper face 38, a bottom face resting upon the bottom wall 20 and a downwardly-extending collar or annular flange 39 extending from the axial center of the body of the portion 36 and adapted to fit snugly in the opening 21. The flange or collar 39 has interior screw threads to be engaged by the screw threads of the shank of a screw 40, the head of which bears against the outer or lower face of a plate 41 with the plate disposed over the central part of the bottom face of the bed-plate 12 and provided with an opening for this shank. Thus any portion 35, 36, 35' or 36' may be removed and replaced with another of a different thickness and thus different results will be achieved as will be subsequently described.

The formers and/or cutters holder H is shown more particularly in Figs. 3, 5 and 9. It comprises a fairly thick disc 45 with substantially flat upper and lower faces 46 and 47 respectively, a central screw-threaded bore 48 from face to face, a plurality of radially-extending screw threaded bores 49 extending from the periphery of the disc and a plurality of former and/or cutter shank-receiving openings 50 extending from the face 46 to face 47 with a separate bore 49 extending to each opening 50. In the example shown the openings 50 are square, arranged with a pair, substantially 180° apart, disposed a substantially equal distance from the axial center of the disc 45 and the distance of each pair varying from that of all other pairs. A suitable set screw 51 is adapted to be carried by each bore 49 and to clamp a former and/or cutter K, next to be described, in place.

Figs. 1, 3, 5 and 9 illustrate a preferred former and/or cutter K. This is provided with a shank portion 55 having faces and a transverse cross section to be snugly accommodated in any opening 50 and a lower edge to provide an inclined cutting edge and, if desired, a partial forming edge. That is, there is a narrow sharp inclined edge 56 and an outwardly-facing bevelled edge 57 extending upwardly therefrom to the outermost face 57 of the shank portion 55. The lower part of this face 57 cooperates with the bevelled edge 57 to provide a flange-forming means, as may be seen in Fig. 9, whereby the flange of the article D of Figs. 7 and 8 is formed after the cutting or sharp edges 56 of two formers and/or cutters K have cut a circle in the stock C.

Means L to rotate and reciprocate the formers and/or cutters K is shown in Figs. 1 and 2. This means also supports the stock-tensioning means M to be described and, of course, supports the formers and/or cutters holder H. The means L includes a member 60 which is preferably an elongated shaft having an upwardly-opening recess 61 at its upper end and this end is exteriorly screw threaded to detachably secure thereto a suitable crank or handle 62 having a portion 63 providing a closure for the recess 61 and this portion 63 has an axial opening 64 to slidably receive a portion of the means M, with an expansion spiral spring 65 in the recess 61 bearing at one end against the under face of the portion 63 and bearing at its other end upon the upper face of a follower 66 normally seated in the bottom of the recess 61, and detachably secured to the means M as will be described. The follower may comprise an axially perforated disc and a collar extending downwardly therefrom.

Below the follower 66 the member 60 is provided with a longitudinally-extending bore 67 to its lower end.

The intermediate portion 68 of the member 60 is preferably exteriorly screw threaded with the screw threads adapted to cooperate with the interior screw threads of a bushing 69 extending through the opening 18 of the frame collar 14 and secured in place as by a set screw 70 extending from exteriorly of the collar, through a screw threaded bore in the collar and bearing against the bushing 69. Below the exterior screw thread of the member 60, this member may be reduced in circumference so that its lower end portion 71 which has exterior screw threads, may mount the formers and/or cutters holder H, since these last-named screw threads are adapted to cooperate with the screw threads of the central screw-threaded bore 48 of the disc 45. The shoulder formed at the juncture of the portions 68 and 71 limits upward rotative movement of the disc 45 and would, of course, limit upward movement of the member 60 as is now obvious in Fig. 1. To limit downward movement of the member 60 I may provide a suitable stop, as an abutment comprising two nuts 72 and 73 mounted upon the intermediate portion 68 of the member 60 above the bushing 69. Obviously adjustment of these nuts along the member 60 will limit the extent of downward movement of the member 60.

The stock-tensioning means M shown in Figs. 1 and 2 comprises a head portion 75 having a convex lower face 76 and secured to the lower end of a rod 77 which slidably extends through the bore 67, the perforation in the follower 66, the recess 61, with the spring 65 extending about the rod and the latter then extends through the axial opening 64 in the handle 62. The face 76 has substantially the same contour as the concave upper face 38 of the inner ring portions 36 (or face 38 of the ring portion 36'). The follower 66 is detachably secured to the rod 77 as by a set screw 78 extending into and through the follower 66 and bearing against the rod 77. An opening 79 in the member 60 extending to the recess 61 may be provided through which to manipulate the set screw as is clear in Fig. 1.

Rotation of the handle 62 in one direction will rotate the member 60 and, consequently the disc 45 as well as cause the member 60 and disc 45 to descend and the latter will cause each former and/or cutter K to describe a semi-circle as it is carried along by the disc 45. Just before the sharp edge 56 of the formers and/or cutters contact the stock C, the head portion 75 will have distorted the stock, as in Figs. 1 and 4 by forming therein a concavity, and will retain the stock firmly in position at the immediate contacted portion thereof so that the formers and/or cutters K will cut a clean circle. If, then, the formers and/or cutters K continue to descend after the circle is completed, the bevelled faces 57 will bend the material of the stock C downwardly against the inner periphery of the outer ring portion 35 (or 35' as the case may be) as in Fig. 9 and form the flange 80 of the finished article, such as the article D of Figures 7 and 8, which includes the substantially flat portion 81 surrounding the flange 80 defining the opening 82.

As soon as the cut is made (in one case) or the cut and flange are provided (in the other case), the handle 62 is rotated in the opposite direction and the handles 33 also rotated to release the arms 25 from the finished article D and the latter may then be removed, as is now clear.

In the event only a circle is to be cut, the rotation of the handle 62 will proceed only sufficiently to accomplish this, since the screw threads of the immediate portion 68 of the member 60 are so arranged that the descent of the member 60 with respect to the housing E is very gradual and the sloping surfaces of the formers and/or cutters K do not start to form the flanges until the cut has been completed. Adjustment of the nuts 72 and 73 will limit descent of the member 60.

The spring 65 will be compressed as the crank 62 is turned to a position where the head 75 has temporarily forced a portion of the stock C into the concavity 39 and tends to hold the head 75 firmly against the stock but, on the other hand, there will not be such pressure upon the head, as the member 60 continues to descend, as to cause breakage of the head, the die or the like.

Since a considerable portion of the movable hold-down means F is outwardly of the frame E, there is less interference with positioning the stock than if this means was mainly inside the frame.

The very positive hold-down means disclosed herein prevents the stock C from rotating when being cut and this is, of course, very important.

Various changes in the shape, size and arrangement of parts may be made to the form of invention herein shown and described without departing from the spirit of the invention or the scope of the claims.

What is claimed is:

1. A sheet material hold-down means for a sheet material working machine which machine includes a frame having an upwardly-extending wall and an upper wall and bed-plate extending therefrom, said hold-down means, including an arm pivoted to one of said walls, said arm having a free end portion releasably contacting said material, and an elongated abutment rigid with and extending from said arm at a location adjacent said free end portion, and a rod adjustably carried by one of said walls for longitudinal travel toward and away from said abutment and having an end portion provided with an end face shaped for tight frictional engagement with said abutment intermediate the ends of said abutment, with said abutment disposed in the path of travel of said end portion when said end portion contacts said material upon said bed-plate and the longitudinal axis of said rod substantially intersecting the longitudinal axis of said abutment.

2. A sheet material hold-down means according to claim 1 in which said end portion travels in a path inclined with respect to the horizontal plane of said bed-plate.

3. A sheet material hold-down means according to claim 1 in which said end portion travels in a path inclined downwardly and to intersect the transverse medial axis of said abutment.

4. A sheet material hold-down means for a sheet material working machine in which said machine has a frame having an upwardly-extending wall and bed-plate extending therefrom, said hold-down means including a pair of spaced-apart arms pivoted to said upwardly-extending wall, each arm having a free end portion overlaying said bed-plate, a substantially horizontally-disposed elongated cross member abutment rigidly connecting said arms, a rod adjustably carried by said upwardly-extending wall for longitudinal travel in a path inclined from the vertical and horizontal toward and away from said abutment and bed-plate and with the longitudinal axis of said rod intersecting the longitudinal axis of said abutment intermediate the ends of said abutment, and said rod having an end portion, with the medial portion of said abutment disposed in the path of travel of said end portion when said free end portions contact said material upon said bed-plate and the longitudinal axis of said rod is substantially normal to the longitudinal axis of said abutment, and resilient means urging said arms to pivot away from said bed-plate.

References Cited in the file of this patent

UNITED STATES PATENTS

| Number | Name | Date |
|---|---|---|
| 352,359 | Schmiedl | Nov. 9, 1886 |
| 394,776 | Laufman | Dec. 18, 1888 |
| 648,976 | Mourad | May 8, 1900 |
| 715,642 | Curtis | Dec. 9, 1902 |
| 787,052 | Ross | Apr. 11, 1905 |
| 1,006,761 | Kraut | Oct. 24, 1911 |
| 1,353,526 | Frengle | Sept. 21, 1920 |
| 1,519,815 | Vance | Dec. 16, 1924 |
| 1,545,835 | Komow et al. | July 14, 1925 |
| 1,782,674 | Baumgartner | Nov. 25, 1930 |
| 1,952,961 | Yates | Mar. 27, 1934 |
| 2,202,894 | Bihler | June 4, 1940 |
| 2,249,651 | Gilbert | July 15, 1941 |
| 2,523,767 | Knowler | Sept. 26, 1950 |